(12) United States Patent
Jiang

(10) Patent No.: US 8,346,029 B2
(45) Date of Patent: Jan. 1, 2013

(54) HIGHLY RARE-EARTH DOPED FIBER

(75) Inventor: Shibin Jiang, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 399 days.

(21) Appl. No.: 12/628,914

(22) Filed: Dec. 1, 2009

(65) Prior Publication Data

US 2011/0129179 A1     Jun. 2, 2011

(51) Int. Cl.
    *G02B 6/00*     (2006.01)
(52) U.S. Cl. .................... 385/11; 385/142; 385/144
(58) Field of Classification Search .............. None
    See application file for complete search history.

(56) References Cited

U.S. PATENT DOCUMENTS

| 3,756,690 | A | * | 9/1973 | Borrelli et al. ............... 385/1 |
| 3,935,020 | A | * | 1/1976 | Deeg et al. .................. 501/51 |
| 5,087,984 | A | * | 2/1992 | Heiney et al. ............... 359/282 |
| 5,400,418 | A | * | 3/1995 | Pearson et al. .............. 385/11 |
| 7,715,094 | B2 | * | 5/2010 | Tokura et al. ............. 359/341.5 |
| 7,951,735 | B2 | * | 5/2011 | Weber et al. ................. 501/73 |
| 2005/0225815 | A1 | * | 10/2005 | Patel et al. ..................... 359/1 |
| 2005/0225839 | A1 | * | 10/2005 | Patel et al. ................... 359/333 |

OTHER PUBLICATIONS

Ballato et al., "Fabrication of fibers with high rare-earth concentrations for Faraday isolator application", Applied Optics, Oct. 20, 1995, pp. 6848-6854, vol. 34, No. 30.

* cited by examiner

*Primary Examiner* — Uyen Chau N Le
*Assistant Examiner* — Chris Chu
(74) *Attorney, Agent, or Firm* — Dale F. Regelman; Quarles & Brady LLP

(57) ABSTRACT

A multicomponent glass fiber having a doping concentration of 55%-85% (wt./wt.) of a rare-earth oxide is presented. The rare-earth oxide is selected from the group comprising: $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$; $Er_2O_3$, $Tm_2O_3$, $Yb_2O_3$, $La_2O_3$, $Ga_2O_3$, $Ce_2O_3$, and $Lu_2O_3$. Additionally, an all-fiber isolator using highly rare-earth oxide doped fibers is disclosed.

22 Claims, 4 Drawing Sheets

HIGHLY RARE-EARTH DOPED FIBER

GOVERNMENT RIGHTS

The U.S. Government has a paid-up license in this invention and the right in limited circumstances to require the patent owner to license others on reasonable terms as provided for by the terms of Contract No. FA8650-09-C-5433.

FIELD OF THE INVENTION

Various implementations, and combinations thereof, are related to using highly rare-earth doped fibers for Faraday rotation and more particularly to fiber isolators and fiber polarization rotators using highly rare-earth doped fibers.

BACKGROUND OF THE INVENTION

Faraday rotation, or the Faraday effect, is an interaction between light and a magnetic field. When linearly polarized light passes through a parallel magnetic field, the plane of the linearly polarized light is rotated. The rotation of the plane of polarization is proportional to the intensity component of the magnetic field in the direction of the beam of light. Light that is reflected back through the magnetic field is further rotated in the same direction.

The empirical angle of rotation is given by $$\beta = VBd,$$

where $\beta$ is the angle of rotation (in radians), V is the Verdet constant for the material, B is the magnetic flux density in the direction of propagation (in teslas), and d is the length of the path (in meters).

The Verdet constant reflects the strength of the Faraday effect for a particular material. The Verdet constant can be positive or negative, with a positive Verdet constant corresponding to a counterclockwise rotation when the direction of propagation is parallel to the magnetic field. The Verdet constant for most materials is extremely small and is wavelength dependent. Typically, the longer the wavelength the smaller the Verdet constant.

As can be seen from the relationship between the Verdet constant, the path length, and the angle of rotation, a desired angle of rotation can be achieved in a shorter distance where the Verdet constant is high. The highest Verdet constants are found in terbium gallium garnet (TGG), which has a Verdet constant of −40 rad/T·m at 1064 nm. Another material known to exhibit a large Verdet constant is terbium (Tb)-doped glass.

SUMMARY OF THE INVENTION

In one implementation, a multicomponent glass fiber is presented. The multicomponent glass fiber has a doping concentration of 55%-85% (wt./wt.) of a rare-earth oxide. The rare-earth oxide is selected from the group comprising: $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$; $Er_2O_3$, $Tm_2O_3$, $Yb_2O_3$, $La_2O_3$, $Ga_2O_3$, $Ce_2O_3$, and $Lu_2O_3$.

In another implementation, an all-fiber Faraday rotator is presented. The Faraday rotator comprises a multicomponent glass fiber having a doping concentration of 55%-85% (wt./wt.) of a rare-earth oxide. The rare-earth oxide is selected from the group comprising: $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$; $Er_2O_3$, $Tm_2O_3$, $Yb_2O_3$, $La_2O_3$, $Ga_2O_3$, $Ce_2O_3$, and $Lu_2O_3$. The Faraday rotator further comprises a magnetic tube surrounding the multicomponent glass fiber.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

Figure 1:
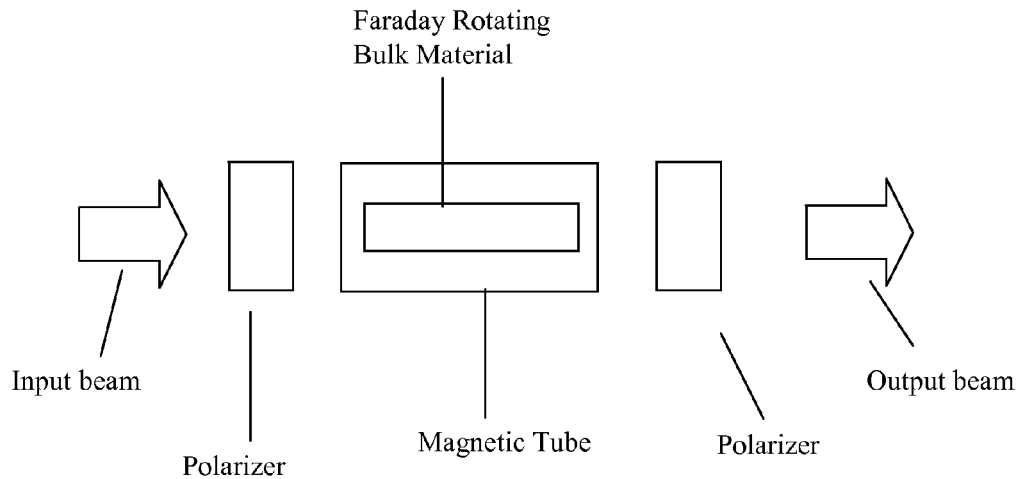
FIG. 1 is a schematic of an exemplary free-space Faraday isolator.

Implementations propose a high rare-earth doped fiber for use in Faraday rotation. Throughout the following description, this invention is described in preferred embodiments with reference to the figures in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment", "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As will be appreciated by one of ordinary skill in the art, Faraday rotation can be used to build a Faraday rotating isolator and/or a Faraday rotator. Specifically, an optical isolator is an optical component which allows the transmission of light in only one direction. A Faraday isolator is a specific type of optical isolator that employs a Faraday rotator, whereas a Faraday rotator is a magneto-optic device that rotates the polarization of light as the light is transmitted through a medium exposed to a magnetic field.

Typically, a Faraday isolator is polarization dependent and consists of two optical polarizers at either end of a Faraday rotator. Polarized light traveling in the forward direction is aligned to be parallel to the polarization direction of the input polarizer and coupled into the Faraday rotator. The Faraday rotator will rotate the polarization by forty-five (45) degrees. The light then passes through the output polarizer, which is aligned to be parallel to the rotated beam in order to have a low attenuation. Back reflected light propagating in the opposite direction is rotated an additional forty-five (45) degrees when it passes through the Faraday rotator a second time, thereby resulting in an orthogonal polarization direction compared to the input laser beam polarization. The input polarizer thus blocks the reflected light.

Typically, Faraday rotators consist of terbium gallium garnet (TGG) crystal or terbium-doped glass inserted into a magnetic tube. The residual flux density of the magnetic tube should be strong enough to produce a forty-five (45) degree polarization rotation when the light passes through the Faraday rotator. In certain embodiments, the magnetic tube comprises a tube of ferromagnetic material. In certain embodiments, the magnetic tube comprises a tube of any material exposed to a magnetic field.

Figure 2:
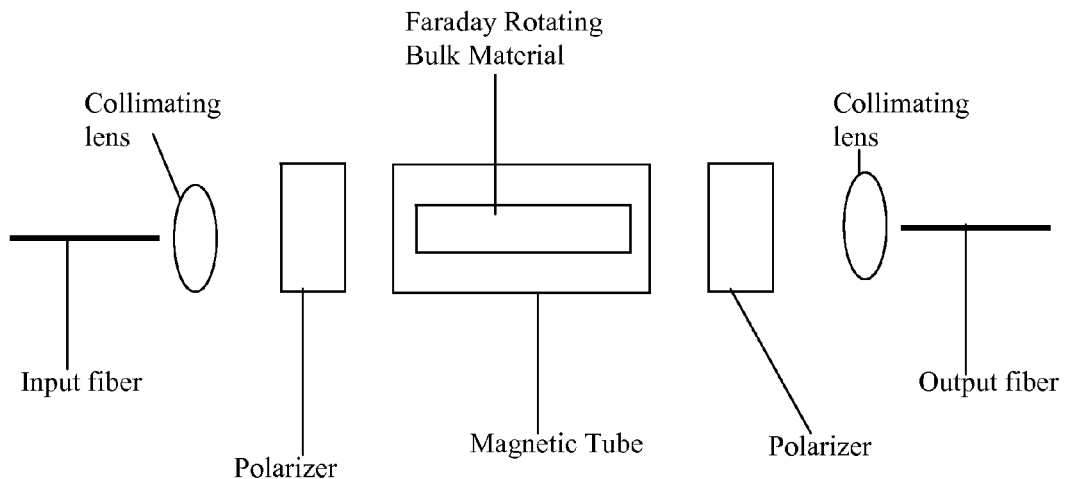
FIG. 2 is a schematic of an exemplary fiber pigtailed free-space Faraday isolator.

Common commercially available Faraday isolators are free-space isolators. As will be appreciated by one of ordinary skill in the art, free-space isolators have actual space between components. FIG. 1 presents a schematic of an exemplary free-space Faraday isolator and FIG. 2 presents a schematic of an exemplary fiber pigtailed free-space Faraday isolator.

The development of fiber isolators has become critical given recent advancements in high powered fiber lasers. Fiber lasers having as great as ten (10) kilowatts of output power have been demonstrated, enabling a wide range of new applications from laser welding, laser cutting, and laser drilling to military defense. While these fiber lasers have been successfully introduced into industry, much of their potential is retarded due to the limitations of the currently-available fiber isolators. For the moment, free-space fiber pigtailed isolators, such as depicted in FIG. 2, must be used. Such free-space isolators require fiber termination, lens alignment, and recoupling of the laser to fiber, all of which degrades performance of the fiber lasers. Not only does the use of a free-space isolator limit the power of a fiber laser to about 20 W, but it also lowers the ruggedness and reliability, two of the main advantages of a fiber laser over a free-space solid-state laser.

Applicant's invention discloses a rare-earth doped fiber having a doping concentration greater than 55% (wt.). In certain embodiments, the doping concentration is greater than 65% (wt.). In certain embodiments, the doping concentration is greater than 70% (wt.). In certain embodiments, the doping concentration is between 55%-85% (wt./wt.).

Applicant's invention further discloses a rare-earth doped fiber, used as a Faraday rotating element, that is fusion spliced with a fiber-based polarizer to form an all-fiber isolator. One of ordinary skill in the art will appreciate that fusion splicing is the act of joining two optical fibers end-to-end using heat in such a manner that light passing through the fibers is not scattered or reflected back by the splice.

In certain embodiments, the throughput power of Applicant's Faraday rotating element is greater than 100 W.

Figure 3:
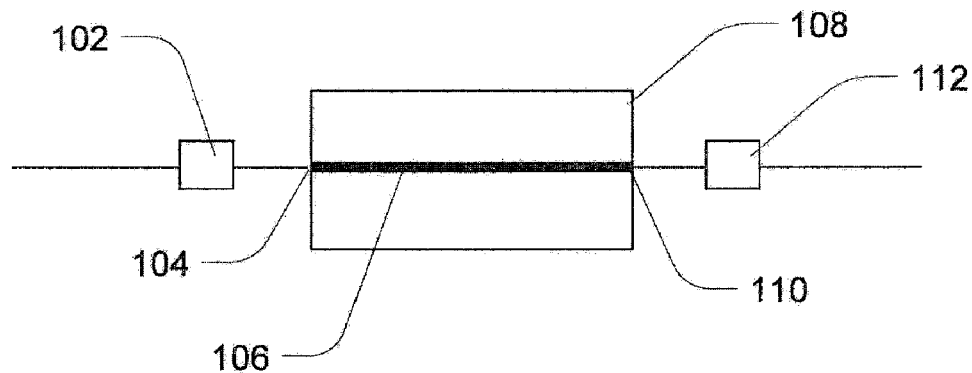
FIG. 3 is an exemplary schematic of Applicant's all-fiber isolator.

Turning now to FIG. 3, an exemplary schematic of Applicant's all-fiber isolator is presented. As can be seen in the illustrated embodiment of FIG. 3, Applicant's all-fiber isolator comprises first fiber-based polarizer 102, Faraday rotating fiber 106 inside magnetic tube 108, and second fiber-based polarizer 112, wherein either end of Faraday rotating fiber 106 is fusion spliced (depicted by fiber fusion splicing joints 104 and 110) and acts as the Faraday rotating element.

Faraday rotating fiber 106 can be doped with any rare-earth oxide. In certain embodiments, Faraday rotating fiber 106 is doped with $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, $Lu_2O_3$, or a combination thereof.

Figure 4:
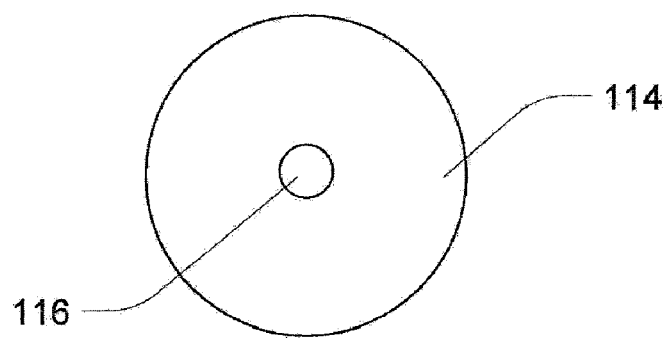
FIG. 4 is a graph of the transmission spectra of terbium-doped glass.

In certain embodiments, Faraday rotating fiber 106 is doped with $Tb_2O_3$. The transmission spectra of terbium-doped glass is presented in FIG. 4. As can be seen in the illustrated embodiment of FIG. 4, while $Tb_2O_3$ exhibits the largest Verdet constant out of the rare-earth oxides, it also absorbs light near 1.5 microns and 2 microns. This is significant as near 1.5 micron and near 2 micron fiber lasers have a high transmission in air and are considered to emit an eye-safe wavelength.

Figure 6:
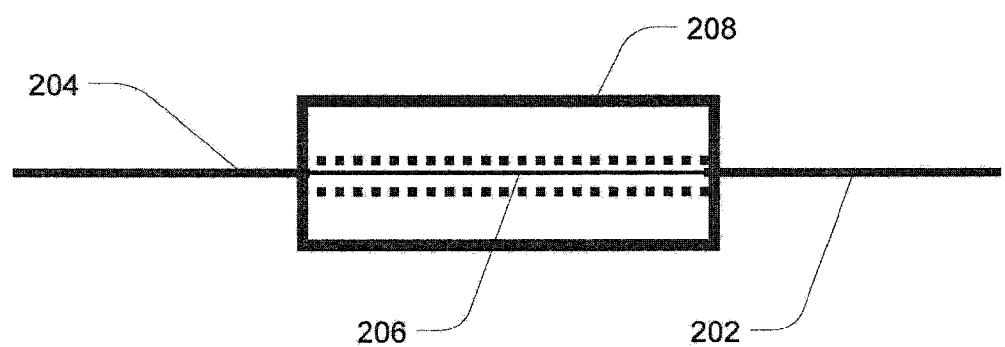
FIG. 6 is a schematic of another embodiment of Applicant's all-fiber isolator comprising two types of fibers having opposite Verdet Constants.
Figure 7:
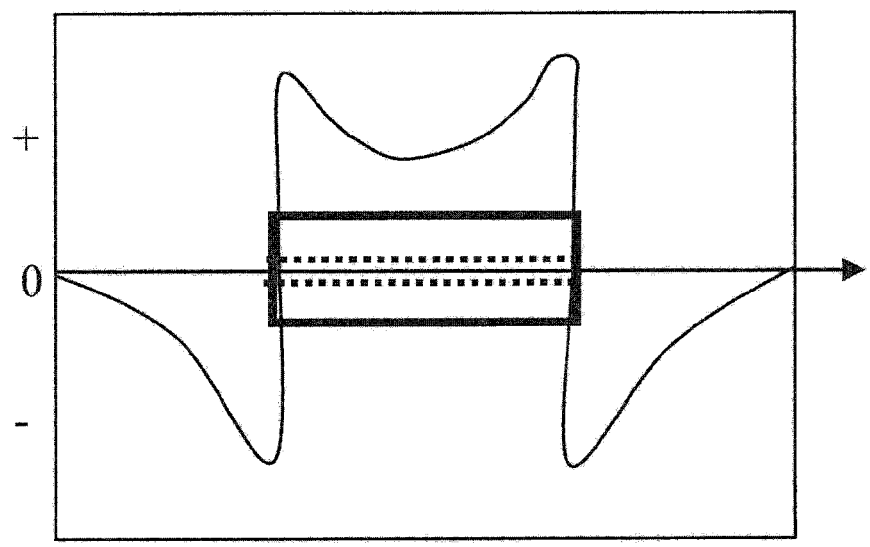
FIG. 7 is a graph of the magnetic filed distribution of the all-fiber isolator of FIG. 6.

Turning now to FIG. 6, an exemplary schematic of an alternative embodiment of Applicant's all-fiber isolator is presented. FIG. 7 depicts the magnetic field distribution of the all-fiber isolator of FIG. 6. In the illustrated embodiment of FIG. 6, the Faraday rotation of Applicant's all-fiber isolator is increased by using two types of fibers having Verdet constants with opposite signs, wherein one type of fiber is place inside of a magnetic tube and the other fiber is placed at one or both ends outside the magnetic tube. Thus, in the illustrated embodiment of FIG. 6, fibers 202 and 204 have a Verdet constant having a first sign while fiber 206 within magnetic tube 208 has a different sign. In certain embodiments, fibers 202 and 204 are fusion spliced with fiber 206 within magnetic tube 208. In certain embodiments, fiber 206 within magnetic tube 208 has a negative Verdet constant while fibers 202 and 204 have a positive Verdet constant. In other embodiments, fiber 206 within magnetic tube 208 has a positive Verdet constant while fibers 202 and 204 have a negative Verdet constant. In certain embodiments, the fiber having a positive Verdet constant is doped with $Yb_2O_3$, $Sm_2O_3$, $Gd_2O_3$, and/or $Tm_2O_3$. In certain embodiments, the fiber having a negative Verdet constant is doped with $Tb_2O_3$.

Returning to FIG. 3, in certain embodiments, Faraday rotating fiber 106 is doped with $La_2O_3$, $Ga_2O_3$, $Yb_2O_3$, $Ce_2O_3$. In such embodiments, the fiber laser may be a near 1.5 micron or a near 2 micron fiber laser.

In certain embodiments, Faraday rotating fiber 106 is a multicomponent glass. In such embodiments, Faraday rotating fiber 106 may comprise silicate glass, germanate glass, phosphate glass, borate glass, tellurite glass, bismuth glass, or aluminate glass.

In certain embodiments, the multicomponent glass of Faraday rotating fiber 106 further comprises glass network formers, intermediates, and modifiers. As will be understood by one of ordinary skill in the art, the network structure of glass allows for the accommodation of different types of atoms which can significantly change the properties of the glass. Cations can act as network modifiers, disrupting the continuity of the network, or as formers, which contribute to the formation of the network. Network formers have a valence greater than or equal to three and a coordination number not larger than four. Network intermediates have a lower valence and higher coordination number than network formers. In certain embodiments, one or more glass network formers of the multicomponent glass of Faraday rotating fiber 106 comprise $SiO_2$, $GeO_2$, $P_2O_5$, $B_2O_3$, $TeO_2$, $Bi_2O_3$, or $Al_2O_3$.

Table 1 presents examples of terbium-doped silicate glasses, erbium doped glasses, and ytterbium-doped silicate glasses. One of ordinary skill in the art will appreciate that Table 1 is meant to be illustrative and not limiting.

TABLE 1

| | Composition | | | | |
|---|---|---|---|---|---|
| | $SiO_2$ | $Al_2O_3$ | $B_2O_3$ | $CeO_2$ | $Tb_2O_3$ |
| wt % | 9.9 | 0.9 | 7.4 | 0.1 | 72.7 |
| wt % | 13.3 | 13.9 | 10.7 | 0 | 62.2 |

TABLE 1-continued

| wt % | 12.2 | 13.3 | 10 | 0 | 64.5 |
|---|---|---|---|---|---|

| Composition | | | | | |
|---|---|---|---|---|---|
| | $SiO_2$ | $Al_2O_3$ | $B_2O_3$ | $CeO_2$ | $Yb_2O_3$ |
| wt % | 14.8 | 16.5 | 10.3 | 0.1 | 58.3 |

| Composition | | | | | |
|---|---|---|---|---|---|
| | $SiO_2$ | $Al_2O_3$ | $B_2O_3$ | $CeO_2$ | $Er_2O_3$ |
| wt % | 15.1 | 16.8 | 10.5 | 0.1 | 57.6 |

| Composition | | | | | |
|---|---|---|---|---|---|
| | $SiO_2$ | $Al_2O_3$ | $B_2O_3$ | $CeO_2$ | $Yb_2O_3$ |
| wt % | 16 | 17.8 | 11.1 | 0.1 | 55 |

Figure 5:
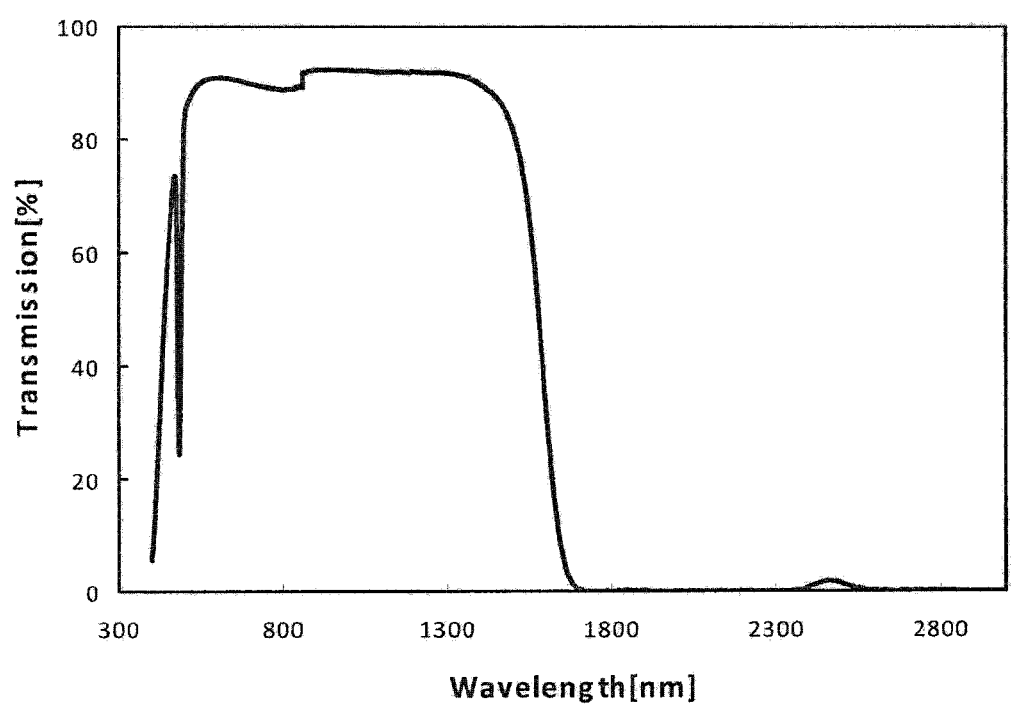
FIG. 5 is a cross sectional view of an exemplary highly rare-earth doped fiber for use as a Faraday rotating fiber according to Applicants' invention.

Turning now to FIG. 5, a cross sectional view of an exemplary highly rare-earth doped fiber for use as a Faraday rotating fiber according to Applicant's invention is presented. As can be seen in the illustrative embodiment of FIG. 5, core glass rod 116 is surrounded by cladding glass tube 114. In such embodiments, the diameter of core glass rod 116 is the same as the inside diameter of cladding glass tube 114, such that there is no space between the core and the cladding.

In certain embodiments, Applicant's Faraday rotating fiber, as depicted in the illustrated embodiment of FIG. 5, is manufactured using a rod-in-tube fiber drawing technique. As will be appreciated by one of ordinary skill in the art, in the rod-in-tube method, a glass rod having a higher refractive index is placed in a glass tube of lower refractive index of compatible material and is then heated until the tube shrinks around the rod. In such embodiments, core glass rod 116 is drilled from a bulk highly rare-earth doped glass and the outside of the core glass rod 116 is polished to a high surface quality. In such embodiments, cladding glass tube 114 is fabricated from another piece of rare-earth doped glass with a slightly lower refractive index. In such embodiments, the inner and outer surfaces of cladding glass tube 114 are polished to a high surface quality.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

While the preferred embodiments of the present invention have been illustrated in detail, it should be apparent that modifications and adaptations to those embodiments may occur to one skilled in the art without departing from the scope of the present invention as set forth in the following claims.

We claim:

1. A multicomponent silicate glass fiber comprising:
    a core having a first doping concentration of 55%-85% (wt./wt.) of a first rare-earth oxide; and
    a cladding having a second doping concentration of 55%-85% (wt./wt.) of a second rare-earth oxide;
    wherein:
        the first rare-earth oxide and the second rare-earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$; and
        a refractive index of the cladding is lower than a refractive index of the core.

2. The multicomponent silicate glass fiber of claim 1, wherein the core further comprises:
    one or more network formers selected from the group consisting of $SiO_2$, $GeO_2$, $P_2O_5$, $B_2O_3$, $TeO_2$, $Bi_2O_3$, and $Al_2O_3$;
    a network intermediate; and
    a network modifier.

3. An all-fiber Faraday rotator, comprising:
    a multicomponent silicate glass fiber comprising:
        a core having a first doping concentration of 55%-85% (wt./wt.) of a first rare-earth oxide; and
        a cladding having a second doping concentration of 55%-85% (wt./wt.) of a second rare-earth oxide;
        wherein:
            the first rare-earth oxide and the second rare-earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $HO_2O_3$, $Er_2O_3$, $Tm_2O_3$, $Yb_2O_3$, $La_2O_3$, $Ga_2O_3$, $Ce_2O_3$, and $Lu_2O_3$; and
            a refractive index of the cladding is lower than a refractive index of the core; and
    a magnetic tube surrounding the multicomponent silicate glass fiber.

4. The all-fiber Faraday rotator of claim 3, wherein the core further comprises:
    one or more network formers selected from the group consisting of $SiO_2$, $GeO_2$, $P_2O_5$, $B_2O_3$, $TeO_2$, $Bi_2O_3$, and $Al_2O_3$;
    a network intermediate; and
    a network modifier.

5. The all-fiber Faraday rotator of claim 3, wherein the multicomponent silicate glass fiber further comprises a first end and a second end, wherein the first end and the second end are fusion spliced.

6. The all-fiber Faraday rotator of claim 5, further comprising:
    a first fiber-based polarizer; and
    a second fiber-based polarizer, wherein the first fiber-based polarizer is adjacent to the first end and the second fiber-based polarizer is adjacent to the second end.

7. The all-fiber Faraday rotator of claim 3, wherein the first doping concentration is between 65%(wt.) to 85% (wt).

8. The all-fiber Faraday rotator of claim 3, wherein the first doping concentration is between 70%(wt.) to 85% (wt).

9. The all-fiber Faraday rotator of claim 3, wherein the first rare-earth oxide is $Tb_2O_3$, the all-fiber Faraday rotator further comprising a fiber laser wavelength between 500 nm and 1.5 microns.

10. The all-fiber Faraday rotator of claim 9, further comprising a throughput power greater than 100 W.

11. The all-fiber Faraday rotator of claim 3, wherein the first rare-earth oxide is selected from the group consisting of $La_2O_3$, $Ga_2O_3$, $Yb_2O_3$, and $Ce_2O_3$, the all-fiber faraday rotator further comprising a fiber laser wavelength between 1.5 microns to 2.5 microns.

12. The all-fiber Faraday rotator of claim 3, wherein the multicomponent silicate glass fiber is a single mode fiber.

13. The all-fiber Faraday rotator of claim 3, wherein the multicomponent silicate glass fiber is a multiple mode fiber.

14. An all-fiber Faraday rotator, comprising:
a first multicomponent silicate glass fiber comprising:
- a first core comprising:
  - a first Verdet constant having a first sign; and
  - a first doping concentration of 55%-85% (wt./wt.) of a first rare-earth oxide; and
- a first cladding comprising a third doping concentration of 55%-85% (wt./wt.) of a third rare-earth oxide, wherein a refractive index of the first cladding is lower than a refractive index of the first core;

a second multicomponent silicate glass fiber comprising:
- a second core comprising:
  - a second Verdet constant having a second sign, wherein the first sign and the second sign differ; and
  - a second doping concentration of 55%-85% (wt./wt.) of a second rare-earth oxide; and
- a second cladding comprising a fourth doping concentration of 55%-85% (wt./wt.) of a fourth rare-earth oxide, wherein a refractive index of the second cladding is lower than a refractive index of the second core; wherein the first rare-earth oxide, the second rare-earth oxide, the third rare-earth oxide, and the fourth rare-earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$; and
- a magnetic tube surrounding the first multicomponent silicate glass fiber.

15. The all-fiber Faraday rotator of claim 14, wherein the first multicomponent silicate glass fiber and the second multicomponent silicate glass fiber each further comprise:
- one or more network formers selected from the group consisting of $SiO_2$, $GeO_2$, $P_2O_5$, $B_2O_3$, $TeO_2$, $Bi_2O_3$, and $Al_2O_3$;
- a network intermediate; and
- a network modifier.

16. The all-fiber Faraday rotator of claim 14, wherein the second multicomponent silicate glass fiber comprises a first portion and a second portion, wherein the first multicomponent silicate glass fiber comprises a first end and a second end, wherein the first portion is fusion spliced with the first end and the second portion is fusion spliced with the second end.

17. The all-fiber Faraday rotator of claim 14, wherein at least one of the first doping concentration and the second doping concentration is between 65%(wt.) to 85% (wt).

18. The all-fiber Faraday rotator of claim 14, wherein at least one of the first doping concentration and the second doping concentration is between 70%(wt.) to 85% (wt).

19. The all-fiber Faraday rotator of claim 14, wherein either the first rare-earth oxide or the second rare-earth oxide is $Tb_2O_3$; the all-fiber Faraday rotator further comprising:
- a fiber laser wavelength between 500 nm and 1.5 microns; and
- a throughput power greater than 100 W.

20. The all-fiber Faraday rotator of claim 14, wherein either the first rare-earth oxide or the second rare-earth oxide is selected from the group consisting of $La_2O_3$, $Ga_2O_3$, $Yb_2O_3$, and $Ce_2O_3$, the all-fiber faraday rotator further comprising a fiber laser wavelength between 1.5 microns to 2.5 microns.

21. An all-fiber Faraday isolator, comprising:
a Faraday rotator having a first end and a second end, wherein the Faraday rotator comprises:
- a first multicomponent silicate glass fiber comprising;
  - a first core comprising a first doping concentration of 55%-85% (wt./wt.) of a first rare-earth oxide; and
  - a first cladding comprising a third doping concentration of 55%-85% (wt./wt.) of a third rare-earth oxide;
- wherein:
  - a refractive index of the first cladding is lower than a refractive index of the first core; and
  - the first rare-earth oxide and the third rare-earth oxide are selected from the first group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$;
- a magnetic tube surrounding the first multicomponent silicate glass fiber;
an input polarizer adjacent to the first end; and
an output polarizer adjacent to the second end.

22. The all-fiber Faraday isolator of claim 21, wherein the first core further comprises a first Verdet constant having a first sign, wherein the Faraday rotator further comprises:
a second multicomponent silicate glass fiber comprising:
- a second core comprising:
  - a second Verdet constant having a second sign, wherein the first sign and the second sign differ; and
  - a second doping concentration of 55%-85% (wt./wt.) of a second rare-earth oxide; and
- a second cladding comprising a fourth doping concentration of 55%-85% (wt./wt.) of a fourth rare-earth oxide;
wherein:
the second rare-earth oxide and the fourth rare-earth oxide are selected from the second group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$; and
a refractive index of the second cladding is lower than a refractive index of the second core.

* * * * *